United States Patent
Hernandez Sanchez et al.

(10) Patent No.: US 11,238,034 B2
(45) Date of Patent: *Feb. 1, 2022

(54) RECOMMENDATION PLATFORM FOR STRUCTURED QUERIES

(71) Applicant: AT&T Intellectual Property I, L.P., Atlanta, GA (US)

(72) Inventors: Ivan Dario Hernandez Sanchez, Dallas, TX (US); Roderic Paulk, Wylie, TX (US); Sheldon Kent Meredith, Roswell, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 158 days.

This patent is subject to a terminal disclaimer.

(21) Appl. No.: 16/658,105

(22) Filed: Oct. 20, 2019

(65) Prior Publication Data
US 2020/0050603 A1 Feb. 13, 2020

Related U.S. Application Data

(63) Continuation of application No. 15/266,009, filed on Sep. 15, 2016, now Pat. No. 10,452,652.

(51) Int. Cl.
*G06F 16/00* (2019.01)
*G06F 16/245* (2019.01)
(Continued)

(52) U.S. Cl.
CPC ............ *G06F 16/245* (2019.01); *G06F 16/22* (2019.01); *G06F 16/248* (2019.01);
(Continued)

(58) Field of Classification Search
CPC .... G06F 16/245; G06F 16/22; G06F 16/2425; G06F 16/2455; G06F 16/24575; G06F 16/24578; G06F 16/248
(Continued)

(56) References Cited

U.S. PATENT DOCUMENTS 6,026,391 A  2/2000 Osborn et al.
6,418,448 B1  7/2002 Sarkar
(Continued)

FOREIGN PATENT DOCUMENTS

WO  WO 2005/017667  2/2005

OTHER PUBLICATIONS

Goldberg, David, et al. "Using collaborative filtering to weave an information tapestry." *Communications of the ACM* 35.12 (1992): pp. 61-70.
(Continued)

*Primary Examiner* — Thanh-Ha Dang

(57) ABSTRACT

In one example, a processor receives a structured query, parses the structured query into components, and stores the structured query, the components, and at least one attribute regarding the structured query in a first query record of a query record storage platform, the at least one attribute comprising a user identification of a user generating the structured query. The processor may then receive a search associated with the query record storage platform, where the search includes at least one parameter, and where the at least one parameter specifies at least one of the structured query, at least one of the components, or at least one of the at least one attribute regarding the structured query, and return the first query record in response to the search.

20 Claims, 4 Drawing Sheets

(51) Int. Cl.
*G06F 16/22* (2019.01)
*G06F 16/248* (2019.01)
*G06F 16/2455* (2019.01)
*G06F 16/2457* (2019.01)
*G06F 16/242* (2019.01)

(52) U.S. Cl.
CPC ...... *G06F 16/2425* (2019.01); *G06F 16/2455* (2019.01); *G06F 16/24575* (2019.01); *G06F 16/24578* (2019.01)

(58) Field of Classification Search
USPC .......................................................... 707/722
See application file for complete search history.

(56) References Cited

U.S. PATENT DOCUMENTS

| | | | |
|---|---|---|---|
| 7,634,456 B2 | 12/2009 | Yagoub et al. | |
| 8,504,583 B1 | 8/2013 | Ke et al. | |
| 8,732,171 B2 | 5/2014 | Paparizos et al. | |
| 8,762,384 B2 | 6/2014 | Heidasch | |
| 8,984,000 B2 | 3/2015 | Tuzhilin et al. | |
| 9,367,607 B2 | 6/2016 | Vee et al. | |
| 9,959,318 B2* | 5/2018 | Lee | G06F 16/2423 |
| 10,452,652 B2* | 10/2019 | Hernandez Sanchez | G06F 16/22 |
| 2005/0015369 A1* | 1/2005 | Styles | G06F 16/24547 |
| 2009/0164929 A1 | 6/2009 | Chen | |
| 2010/0017395 A1 | 1/2010 | Wayn | |
| 2010/0082604 A1 | 4/2010 | Gutt et al. | |
| 2011/0208715 A1 | 8/2011 | Ni et al. | |
| 2012/0191502 A1 | 7/2012 | Gross | |
| 2012/0303561 A1* | 11/2012 | Sathish | G06N 20/00 706/14 |
| 2014/0040306 A1 | 2/2014 | Gluzman Peregrine | |
| 2014/0188927 A1* | 7/2014 | Moxley | G06F 16/9535 707/769 |
| 2014/0283096 A1 | 9/2014 | Neerumalla | |
| 2014/0365456 A1 | 12/2014 | Lee | |
| 2014/0372412 A1* | 12/2014 | Humphrey | G06F 16/90335 707/722 |
| 2015/0142785 A1 | 5/2015 | Roberts et al. | |
| 2015/0269175 A1 | 9/2015 | Espenshade et al. | |
| 2015/0317316 A1 | 11/2015 | Ghanekar et al. | |
| 2015/0379134 A1* | 12/2015 | Bax | G06F 16/90328 707/722 |
| 2016/0042069 A1* | 2/2016 | Lee-Goldman | G06F 40/295 707/706 |
| 2016/0092506 A1* | 3/2016 | Liu | G06F 16/2453 707/767 |
| 2016/0132509 A1 | 5/2016 | Griffith et al. | |
| 2016/0357830 A1* | 12/2016 | Hornkvist | G06F 16/338 |
| 2017/0199916 A1 | 7/2017 | Loomans | |
| 2018/0075092 A1* | 3/2018 | Hernandez Sanchez | G06F 16/248 |

OTHER PUBLICATIONS

Prem Melville, Vikas Sindhwani. "Recommender Systems". *Encyclopedia of machine learning*. 2010: pp. 829-838.

* cited by examiner

200

210
Querys:

Current query: ← 211
SELECT name, income
FROM employees
WHERE income > 10
ORDER BY name ← 212

Last query:
SELECT demo.cust_uniq_id, cable.ban
FROM demographics demo
JOIN content_provider cable
ON (cable.ban = demo.cust_uniq_id)

220
Type a Database, Table, Field or User | Search
← 221

| Filters | ← 222 |
|---|---|
| Result Size | |
| Execution Time | |
| # Tables | |
| ... | |
| More | |

| Sort By | ← 223 |
|---|---|
| User | |
| Table | |
| ... | |
| More | |

240
Recommendations: ← 241

| USER | Rating | | TABLES | Rating |
|---|---|---|---|---|
| PR1567 | *** | | employees | **** |
| CM237H | ** | | Sales | * |

| QUERY | Rating |
|---|---|
| select * from employees | |
| select name from sales | |

230
Search Results: ← 231

| USER | TABLES | QUERY | TIME |
|---|---|---|---|
| IH197F | Sales | select * from sales | 2016-01-01 19:30 pm |
| RP995A | Sales | select name from sales | 2016-01-01 20:30 pm |

FIG. 2

RECOMMENDATION PLATFORM FOR STRUCTURED QUERIES

This application is a continuation of U.S. patent application Ser. No. 15/266,009, filed Sep. 15, 2016, now U.S. Pat. No. 10,452,652, which is herein incorporated by reference in its entirety.

The present disclosure relates generally to structured queries, and more particular to a recommendation platform for querying structured data sets that enables users, e.g., analysts, data scientists/engineers, etc., to discover previous queries, data sources, and other users.

BACKGROUND

Data analysts may spend time trying to familiarize themselves with data sources that are new to them. Many organizations are affected by this problem, especially large organizations with many different data sets and legacy systems. For example, data analysts, such as business intelligence personnel, data engineers, and data scientists, may spend a substantial amount of time in meetings, sending e-mails, and making phone calls to colleagues trying to figure out how to operate on data sources that are new to them. Additionally, data administrators may not know who to notify if a data source is down or if there is going to be a change in the schema of a particular data source. In particular, data administrators may change over time, and the user bases of various data sources may also change as personnel retire or move on to different projects, different roles, or different organizations.

SUMMARY

In one example, the present disclosure provides a device, computer-readable medium, and method for returning a query record in response to a search associated with a query record storage platform. For example, a method may include a processor receiving a structured query, parsing the structured query into components, and storing the structured query, the components, and additional information regarding the structured query in a first query record of a query record storage platform, the additional information comprising a user identification of a user generating the structured query. The processor may then receive a search associated with the query record storage platform, where the search includes at least one parameter, and where the at least one parameter specifies at least one of the structured query, at least one of the components, or at least one aspect of the additional information regarding the structured query, and return the first query record in response to the search.

BRIEF DESCRIPTION OF THE DRAWINGS

The present disclosure can be readily understood by considering the following detailed description in conjunction with the accompanying drawings, in which:

FIG. 2 illustrates an example user interface for searching for query records, for presenting search results, and for presenting recommendations, according to the present disclosure;

To facilitate understanding, identical reference numerals have been used, where possible, to designate identical elements that are common to the figures.

DETAILED DESCRIPTION

Figure 1:
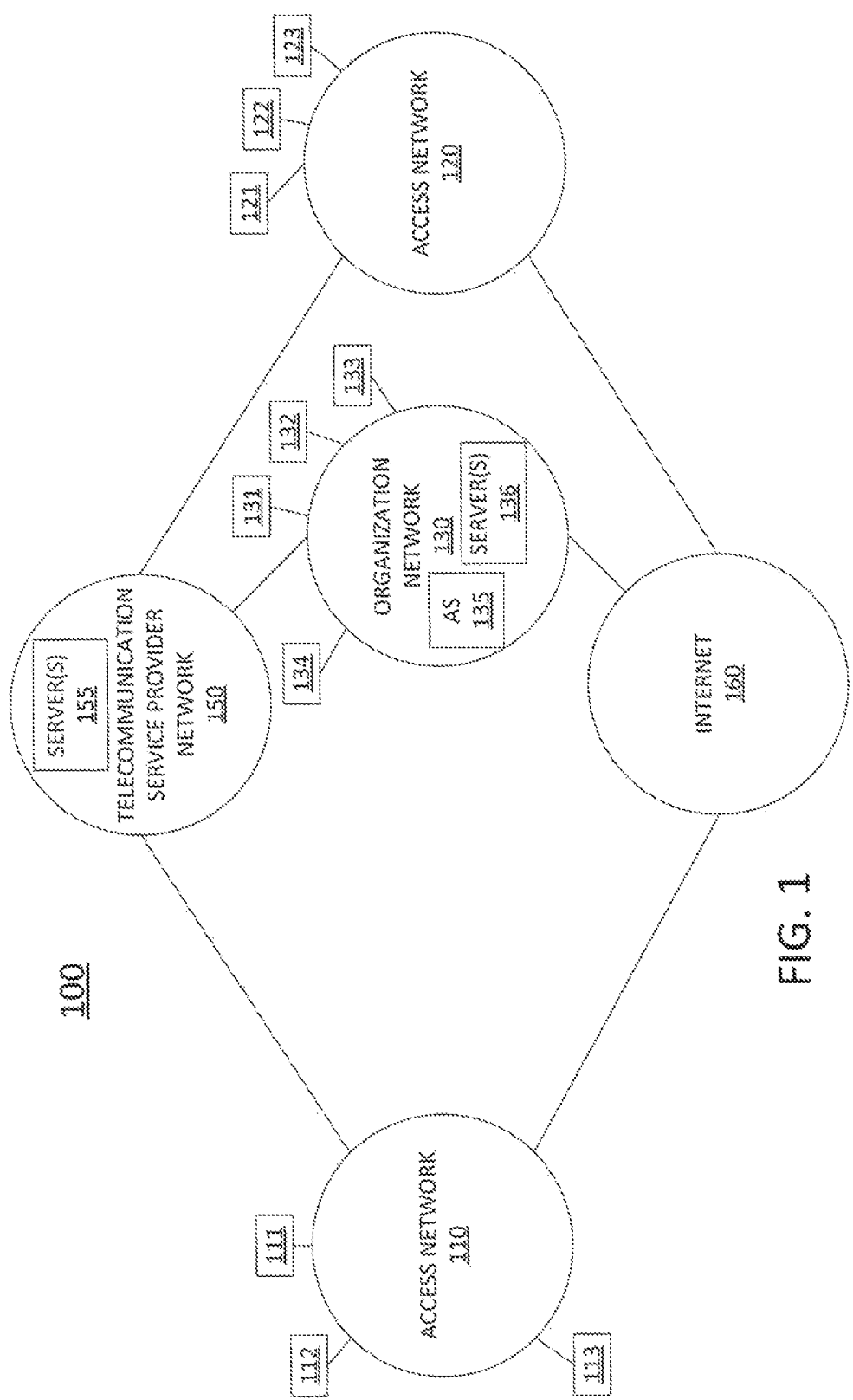
FIG. 1 illustrates one example of a communications network related to the present disclosure.

The present disclosure broadly discloses device, non-transitory (i.e., tangible or physical) computer-readable storage media, and methods for returning a query record in response to a search associated with a query record storage platform. In one example, the present disclosure relates to structured data in a database system that can be accessed through structured query languages. For instance, users of a database system, such as data analysts, business intelligence personnel, data engineers, data scientists, and the like may spend a substantial amount of time in meetings, sending e-mails, and making phone calls to colleagues trying to figure out how to operate on data sources that are new to them. In addition, a user may have a task that calls for access to certain data, but the user may not even know if such data exists in the database system, and if so, where the data resides, how to access the data, and so forth.

In one example the present disclosure provides a recommendation platform that provides recommendations to users of the database system, such as recommended queries, recommended other users, recommended databases, recommended data tables, recommended fields, recommended date ranges, recommended time ranges, and so forth. For example, the present disclosure may store query records regarding structured queries that are entered by users with respect to the database system. To illustrate, a query record for a query may store the query itself, components of the query, such as databases, data tables, fields, date ranges, commands, and so forth that are specified in the query, and attributes of the query, such as a user generating the query, a time the query is entered, an outcome of the query (e.g., successful or unsuccessful execution), a size of a result of the query, e.g., if the query is to return records, perform a join, etc., and so forth. Recommendations may then be derived from the query records that are stored over time. For example, a user may not know how or where to begin a task related to the database system, but may have certain parameters which the user believes may be relevant to the task. Accordingly, in one example, the user may perform a search for query records using parameters such as an identification of another user, a particular database, data table, or field, or a date, a time, or a range of dates/times. The search parameters may then be searched against the stored query records and any query records meeting the search parameter(s) (or meeting the search parameter(s) and any additional criteria) may be returned. In addition, one or more recommendations may also be provided to the user in response to the search.

In one example, a user performing a search may select one or more filter criteria for presenting query records responsive to the search. For instance, the user may select to filter by user identification ("user ID"), by field, by date range, and so forth. To illustrate, if a user submits a search with the parameter of "employees" (the name of a data table), and if the user selected to filter by user ID, query records presented in response to the search may include query records for queries that included the component "employees" and which were submitted by a user specified in the filter criteria. It should be noted that if a database, data table, or field is "popular," there may be many query records associated with the database, data table, or field. Thus, to differentiate among query records associated with the database, data table, or field, sort by criteria may determine how the query records that satisfy the search parameter(s) may be presented. For example, if "sort by" criteria is "date" or "time," the most recent 10 query records, 20 query records, etc. that satisfy the search parameter(s) (or that satisfy the search parameter(s) and any filter criteria) may initially be presented, while additional query records may be retrieved and presented if the user indicates a desire to access additional query records that are responsive to the search. Thus, in accordance with the present disclosure, the ranking and presentation of query records in response to a search may vary depending upon the particular parameter(s) entered, the filter criteria, and so forth.

In one example, recommendations may include users, databases, data tables, fields, date ranges, time ranges, and so forth. For example, for a particular data table in a database of the database system, the present disclosure may determine from the query records: users who perform the most queries with respect to the data table, the most popular fields within the data table in terms of numbers of queries, number of times accessed, number of times returned in results of a query, number of "joins," etc., other data tables that are associated with the data table, such as when there is a significant number of times that the data table is "joined" with the other data table, when a significant number of users access the data table and the other data table within a given time period, a field in another data table that is related to a field specified in a search, (e.g., due to previous successful "joins" of the data tables over the two fields, and so forth. Accordingly, relevant recommendations may then be generated and provided to a user based upon one or more search parameters that are entered by the user. For instance, if a search parameter includes the data table, the recommendations may include: top users with respect to the data table, popular fields with respect to the data table, other data tables associated with the data table, and so forth. The user may then have further insight into possible databases, data tables or fields to explore, other users to follow to learn ways to interact with the data, and so on. In one example, users may rate other users, the queries/query records of other users, the recommendations provided in response to particular search parameters. This user feedback may then be used to adjust rankings of users, queries/query records, databases, data tables, fields, etc. overall or with respect to the search parameters and/or the filter criteria.

To further illustrate, a practical example of the present disclosure is now described. Users A and B may work in a small group that is part of a large organization with many datasets. They have been assigned the task of determining which customers will subscribe to cable television. Users A and B know how to analyze the demographics database of the company, but they do not know how they can get information with respect to whom has bought cable, when, and where. They would like to merge two data sources together to create a predictive model that informs management who is more likely to subscribe to cable television, but the second data source must still be located.

In the absence of the present disclosure, users A and B may proceed as follows. Users A and B may talk with manager C, who mentions that there is a dataset that already has information about who subscribed to what cable service, when they subscribed to the service and where. However, manager C does not know how to access the data, and does not know in which database and/or in which data table the data resides. Therefore, manager C informs users A and B to talk to user D, who many years ago worked with the dataset. After many e-mails, users A and B obtain from user D the name of the database and table. Users A and B start exploring the dataset after their access request has been approved. However, after an initial inspection of a "cable TV" table, users A and B do not know the meaning of each field. There is a field "name id", another one called "customer_id" and another one called "ban," among 100 other fields. Users A and B ask user D, but user D does not remember and does not know who else has worked with the dataset.

With significant guessing and verification via manual inspection, user A finally identifies that the field named "ban," matches exactly to a field in a "demographics" table that is called "cust_uniq_id." User A then proceeds to join the data so that user B can build a model. For instance, user A may enter the structured query: "SELECT demo.cust_uniq_id, cable.ban FROM demographics demo; JOIN content_provider cable; ON (cable.ban=demo.cust_uniq_id)." However, unbeknownst to users A and B, user E faced the same task two years earlier and already presented the results to a different group. Thus, users A and B spent a significant amount of time and effort to redo the same work previously performed by user E.

In contrast, with the benefit of the present disclosure, users A and B may avoid some or all of the above steps. For example, if user D is able to tell users A and B that the relevant data table is called "content_provider," users A and B may enter a search via a user interface of a recommendation platform of the present disclosure. In response to the search, users A and B may be presented with a list of various query records associated with the "content_provider" table. Users A and B may then notice upon reviewing the list of query records that a user E performed a large number of queries regarding the "content_provider" table within the last month. Thus, users A and B may access the content_provider table for further insight and/or may contact user E who may be able to provide helpful guidance. Alternatively, or in addition, users A and B may be provided with one or more recommendations based upon the search parameter(s). For instance, "user E" may be presented as a recommended user, a "demographics" table may be presented as a recommended table, and so forth. For instance, the "demographics" table may be recommended by virtue of the fact that users may perform a large number of operations, such as "joins" with respect to the "content_provider" table and the "demographics" table. Users A and B may then explore the results of various queries of "user E," e.g., by entering "user E" as a parameter of a new search and filtering by "user ID," receiving query records in response to the search, and repeating one or more of the queries associated with the query records.

Users A and B may further specify to sort by "table" for the search. Accordingly, query records of queries by "user E" that include the "content_provider" table as a component may be easily located (e.g., since query records may be listed alphabetically by table, those that relate to "content_provider" may be grouped together in the list). In addition, users A and B may also infer further actions to take, such as submitting a request to an administrator that a combined dataset be stored to alleviate repeated execution of the same or similar join operations. Thus, these and other aspects of the present disclosure are discussed in greater detail below in connection with the examples of FIGS. 1-4.

To aid in understanding the present disclosure, FIG. 1 illustrates an example system 100 comprising a plurality of different networks for supporting the returning of a query record in response to a search associated with a query record storage platform, and other functions. Telecommunication service provider network 150 may comprise a core network with components for telephone services, Internet services, and/or television services (e.g., triple-play services, etc.) that are provided to subscribers, and to peer networks. In one example, telecommunication service provider network 150 may combine core network components of a cellular network with components of a triple-play service network. For example, telecommunication service provider network 150 may functionally comprise a fixed mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, 121-123, and telecommunication service provider network 150 relating to voice telephone calls, communications with web servers via the Internet 160 and/or other networks 130, 140, and so forth. Access networks 110 and 120 may also transmit and receive communications between endpoint devices 111-113, 121-123 and other networks and devices via Internet 160.

For example, one or both of access networks 110 and 120 may comprise an ISP network, such that 111-113 and/or 121-123 may communicate over the Internet 160, without involvement of telecommunication service provider network 150. Endpoint devices 111-113 and 121-123 may each comprise a telephone, e.g., for analog or digital telephony, a mobile device, a cellular smart phone, a laptop, a tablet computer, a desktop computer, a plurality or cluster of such devices, and the like. In one example, the access networks 110 and 120 may be different types of access networks. In another example, the access networks 110 and 120 may be the same type of access network. In one example, one or more of the access networks 110 and 120 may be operated by the same or a different service provider from a service provider operating telecommunication service provider network 150.

In another example, each of access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide mobile core network 130 functions, e.g., of a public land mobile network (PLMN)-universal mobile telecommunications system (UMTS)/General Packet Radio Service (GPRS) core network, or the like. In still another example, access networks 110 and 120 may each comprise a home network, which may include a home gateway, which receives data associated with different types of media, e.g., television, phone, and Internet, and separates these communications for the appropriate devices. For example, data communications, e.g., Internet Protocol (IP) based communications may be sent to and received from a router in one of access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs) and/or home networks, and the like.

In one example, organization network 130 may comprise a local area network (LAN), or a distributed network connected through permanent virtual circuits (PVCs), virtual private networks (VPNs), and the like for providing data and voice communications. In one example, organization network 130 links one or more endpoint devices 131-134 with each other and with Internet 160, telecommunication service provider network 150, devices accessible via such other networks, such as endpoint devices 111-113 and 121-123, and so forth. In one example, endpoint devices 131-134, comprise devices of organizational users of a structured database system, such as business intelligence personnel, data engineers, and data scientists.

In one example, endpoint devices 131-134 may each comprise a personal computer, a desktop computer, a laptop, a tablet computer, a bank or cluster of such devices, a mobile device, a cellular smart phone, and so forth. In one example, any one or more of endpoint devices 131-134 may comprise software programs, logic or instructions for performing or supporting one or more aspects of returning a query record in response to a search associated with a query record storage platform, in accordance with the present disclosure. In one example, organization network 130 may also include an application server (AS) 135. In one example, AS 135 may comprise a computing system, such as computing system 400 depicted in FIG. 4, and may be configured to provide one or more functions for returning a query record in response to a search associated with a query record storage platform, in accordance with the present disclosure. For example, AS 135 may be configured to perform one or more steps, functions, or operations in connection with the example method 300 described below. In addition, AS 135 may interact with server(s) 136 and/or sever(s) 155 which may store database system(s) and/or a query record storage platform, as described in further detail below. In one example, organization network 130 may be associated with the telecommunication service provider network 150. For example, the organization may comprise the telecommunication service provider, where the organization network 130 comprises devices and components to support network administration, business intelligence, and other data analysis functions.

In one example, the system 100 may include one or more servers 136 and/or one or more servers 155 in organization network 130 and telecommunication service provider network 150 respectively. In one example, the servers 136 and/or 155 may each comprise a computing system, such as computing system 400 depicted in FIG. 4, and may be configured to host one or more centralized system components which may comprise all or a portion of a database system and/or a query record storage platform of the present disclosure. For example, a first centralized system component may comprise a database of assigned telephone numbers, a second centralized system component may comprise a database of basic customer account information for all or a portion of the customers/subscribers of the telecommunication service provider network 150, a third centralized system component may comprise a cellular network service home location register (HLR), e.g., with current serving base station information of various subscribers, and so forth. Other centralized system components may include a customer relationship management (CRM) system, an inventory system (IS), an order system, the enterprise reporting system (ERS), the account object (AO) database system, and so forth. In any of these examples, the data stored by various centralized system components may comprise structured data stored in one or more database systems. In other words, server(s) 136 and/or server(s) 155 may comprise one or more database systems in accordance with the present disclosure. Still another centralized system component may comprise a query record storage platform storing query records associated with user queries entered with respect to other centralized system components, e.g., database(s) and/or database system(s).

It should be noted that in one example, a centralized system component may be hosted on a single server, while in another example, a centralized system component may be hosted on multiple servers, e.g., in a distributed manner. Thus, an access of a centralized system component may, in some cases, involve accessing several physical servers. In one example, at least a portion of the data stored in servers 136 may be copied or derived from data on servers 155 in telecommunication service provider network 150. For instance, servers 155 may collect call detail records (CDRs) in real time, while servers 136 may store summary records derived from the CDRs that are stored in a format that is accessible via a structured query language.

In one example, one or more users of endpoint devices 131-134 may therefore access various centralized system components in connection with performing tasks regarding a database system, such as entering queries, searching for query records in a query record storage platform, receiving recommendations, and so forth. An example user interface that may be displayed via devices 131-134 is described in greater detail below in connection with FIG. 2. In one example, users may connect to AS 135 via devices 131-134, and AS 135 may retrieve data from databases stored in server(s) 136 and/or server(s) 155 in response to user queries. In addition, AS 135 may generate query records, store the query records in a query record storage platform hosted on server(s) 136 and/or server(s) 155, and retrieve the query records from server(s) 136 and/or server(s) 155 to provide as recommendations in response to other user's searches. In other words, AS 135 may function as a recommendation platform in accordance with the present disclosure.

The foregoing describes just one example of a system or network in which examples of the present disclosure may be implemented. Thus, it should be realized that the network 100 may be implemented in a different form from that illustrated in FIG. 1, or may be expanded by including additional endpoint devices, access networks, network elements, application servers, etc. without altering the scope of the present disclosure. It should also, be noted that the example of FIG. 1 is presented in connection with an organization that operates a telecommunication service provider network. However, other, further, and different examples of the present disclosure may relate to a database system of a different type of entity, such as a bank, a school, a hospital, an insurance company, and so forth. As such, it should be understood that various other types of network architectures may be deployed in connection with examples of the present disclosure for returning of a query record in response to a search associated with a query record storage platform. As just one example, an insurance company may store homeowner's insurance data and car insurance data in separate databases that reside within infrastructure of a cloud-based data storage platform. In one example, a user may access these databases to correlate customers who have both homeowner's insurance and car insurance with the company through a personal computer connected to the cloud-based data storage platform via a corporate local area network (LAN) and the Internet. The insurance company may further store query records in a query record storage platform residing within the same or different cloud-based infrastructure as the database system storing the homeowner's insurance data and the car insurance data. Thus, these and other variations are all contemplated within the scope of the present disclosure.

To further aid in understanding the present disclosure, FIG. 2 illustrates an example user interface 200 which may be presented on a user device for searching for query records, for presenting search results, and for presenting recommendations, in accordance with the present disclosure. User interface 200 includes a query window 210, a search window 220, a search results window 230, and a recommendation window 240. With respect to query window 210, a user may enter queries and receive the results of queries. For instance, a current query 211 may be input but not yet entered. The current query 211 may comprise, for example: "SELECT name, income FROM employees WHERE income>10 ORDER BY name." In this case, only "name" and "income" would be selected for each record of the table "employees". Results would be sorted alphabetically by "name" and only records where "income" is greater than 10 would be fetched. In addition, a last/previous query 212 may also appear in the query window 210, e.g., depending upon the space or number of lines available, the number of lines of the current query 211, etc. In one example, query results may be presented within query window 210, or may be accessed and/or presented via a separate window (not shown).

In one example, query records for queries entered via query window 210 and though other user devices may be stored and made accessible to other users performing searches in accordance with the present disclosure. In particular, the query described above specifies table names, field names, filtering conditions and ranking methods. Because of the structured format, queries of this nature may provide information as to how to join tables, which fields are unique, which databases are related, the type(s) of data contained in a particular field, which fields have the same content but different labels, which users are subject matter experts, which tables/databases are most important, and so on. However, if the queries are not stored and are not made available for further use, the knowledge represented by such queries may be lost.

In one example, search window 220 includes a search bar 221, a filter criteria selection box 222 and a "sort by" box 223. In one example, a user may enter one or more search parameters in search bar 221, such as an identification of a user, a database, a data table, a field, a date/time range, and so forth. In one example, a user may select zero, or one or more filter criteria, such as result size, execution time, number of tables, etc., via filter criteria selection box 222. In addition, in one example, the user may select zero, or one or more sort-by criteria via "sort by" box 223. The filter criteria selected may exclude or confine results to only those results that conform to the filter criteria. In addition, the sort-by criteria may affect the order in which the results of the search are presented in search results window 230. For instance, the present disclosure may invoke a search engine and/or include search engine functionality to perform a search according to the search parameter(s), as well as the filter criteria and/or "order by" criteria, and to return a set of relevant results 231 in results window 230.

As illustrated in FIG. 2, the results 231 in search results window 230 include two query records, or at least a portion thereof. For instance, as mentioned above, a query record may include a query, components of the query, and attributes regarding the query. In the present example, results 231 are presented in a table with columns for "user," "table," "query," and "time." The "user" and "time" fields may be considered "attributes" of the query. The "query" field is for the full query, and the "table" field represents one of the "components" of the query, i.e., any table(s) specified in the query. For instance, in the present example, a user may have entered "sales" in the search bar 221 and may have filtered by the date of Jan. 1, 2016 ("2016-01-01"). As such, the results may include two query records, both of which relate to the table "sales," and both of which are from the relevant date. In one example, the user may also have selected to sort by "time" via the "sort by" box 223. As such, the query record for an earlier query may appear first in the results 231, followed by the query record for a later query. Alternatively, the user may have selected to sort by "user" via the "sort by" box 223. As such, the query record associated with a query of user "IH197F" may appear first followed by the query record associated with the query of user "RP895A." In other words, the query records may have presented in alphabetical order by user ID in the results 231.

In addition to returning results of a search, the present disclosure may also provide recommendations, e.g., based upon the last entered search. For example, as illustrated in FIG. 2, recommendation window 240 may provide recommendations, e.g., in one or more lists 241. For instance, a recommended subject, such as a recommended query, a recommended user, a recommended database, a recommended data table, a recommended field, a recommended date range, a recommended time range, or a recommended data operation may be determined based upon the search parameter(s), or based upon the search parameter(s) along with the filter criteria and/or the sort-by criteria. In one example, the recommendations of the list(s) 241 may therefore be associated with recommended subjects that may be identified. For instance, the table "employees" may have been "joined" several times with the table "Sales." Therefore, a search parameter of "sales" may return the results 231 in search results window 230, and may also lead to a recommended table of "employees." In addition, a search parameter of "sales" may lead to a recommended user "CM237H." For example, user "CM237H" may generate a greater number of queries regarding the "Sales" table than other users. As such, a query record regarding the table "Sales" and a query generated by user "CM237H" may be provided as a recommendation, e.g., as the second entry in list 241. A user may then identify a recommended subject of interest and may use the recommended subject as a search parameter for a subsequent search, for example.

In still another example, query records, components of query records, and/or query attributes may be rated by users with respect to applicability or usefulness regarding a particular search parameter. For instance, another user may have entered a search parameter of "Sales" and received the same recommendations as presented in recommendation window 240. The previous user may have then provided a 4-star rating to recommendation of the "employees" table and a 2-star rating to the user "CM237H" with respect to that search parameter. When another user enters the same search parameter, the ratings of the recommendations/recommendation subjects may therefore be presented alongside the recommendations in the list(s) 241. In should be noted that the foregoing describes only a few examples of how recommendations may be selected and presented in accordance with the present disclosure. For instance, in another example, recommendations may be presented in the form of query records. For example, after a recommended subject is identified, one or more query records associated with the recommended subject may be selected and presented via the recommendation window 240.

In still other examples, ratings of possible recommended subjects may be determined with respect to various search parameters in different ways. For instance, if the at least one recommended subject comprises a recommended user, the rank may be based upon a number of queries of the recommended user with respect to a database, a data table, or a field specified in the search. In another example, if the at least one recommended subject comprises a recommended database, the rank may be based upon at least one of: a volume of queries associated with the recommended database, or a volume of joining of data tables of the recommended database. In another example, if the at least one recommended subject comprises a recommended data table, the rank may be based upon at least one of: a volume of queries associated with the recommended data table, or a volume of joining of the recommended data table. In still another example, if the at least one recommended subject comprises a recommended field, the rank may be based upon at least one of: a volume of queries associated with the recommended field, or a volume of joining over the recommended field. Thus, these and other variations are all contemplated within the scope of the present disclosure.

Figure 3:
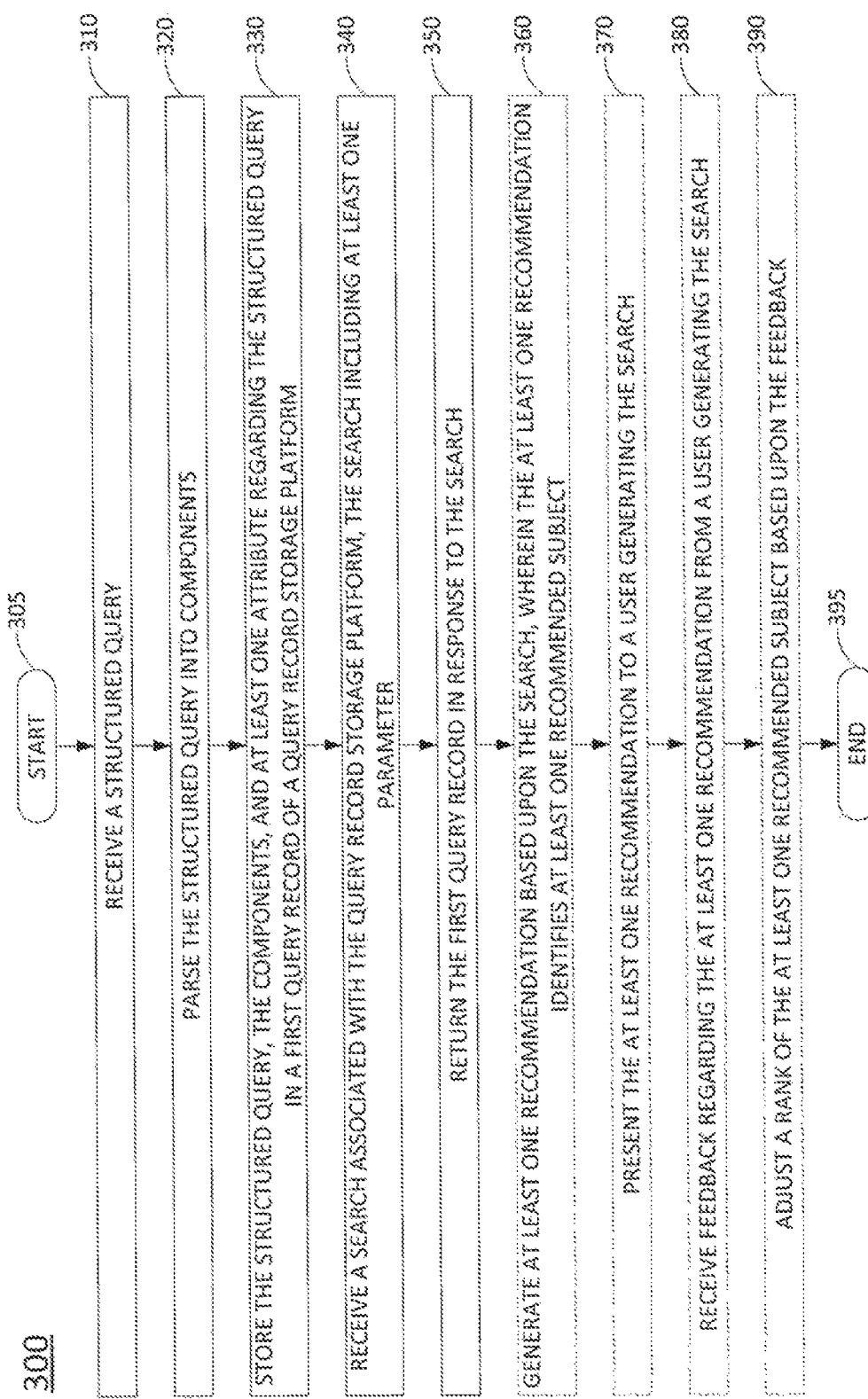
FIG. 3 illustrates an example flowchart of a method for returning a query record in response to a search associated with a query record storage platform.

FIG. 3 illustrates an example flowchart of a method 300 for returning of a query record in response to a search associated with a query record storage platform. In one example, the steps, operations, or functions of the method 300 may be performed by any one or more of the components of the system 100 depicted in FIG. 1. For instance, in one example, the method 300 is performed by the application server 135. Alternatively, or in addition, one or more steps, operations or functions of the method 300 may be implemented by a computing device having a processor, a memory and input/output devices as illustrated below in FIG. 4, specifically programmed to perform the steps, functions and/or operations of the method. Although any one of the elements in system 100 may be configured to perform various steps, operations or functions of the method 300, the method will now be described in terms of an example where steps or operations of the method are performed by a processor, such as processor 402 in FIG. 4.

The method 300 begins at step 305 and proceeds to step 310. At step 310, the processor receives a structured query. The structured query may be entered by a user against a database system with one or more databases. Each database may have one or more data tables, and each data table may have one or more fields populated with data. The structured query may be entered in a structured query language, and the database system may store data in a structured format that is accessible via structured queries.

At step 320, the processor parses the structured query into components. For example, components of the structured query may include types of data operations contained in the structured query such as JOIN, SELECT, ORDER BY, etc., databases, data tables, or fields that are identified in the structured query, a date range or a time range specified in the query, and so forth.

At step 330, the processor stores the structured query, the components, and at least one attribute regarding the query in a first query record of a query record storage platform. In one example the query record storage platform may share hardware with the database system. In another example, the query record storage platform and the database system may utilize different infrastructure. In one example, the at least one attribute includes a user identification of a user generating the query. In one example, the at least one attribute may further include a time of the query and/or a size of a result of the query.

At step 340, the processor receives a search associated with the query record storage platform, the search including at least one parameter, the at least one parameter specifying at least one of: the query, at least one of the components, or at least one of the at least one attribute regarding the query. In one example, the search may also include or may be accompanied by one or more filter criteria and one or more "sort by" criteria.

At step 350, the processor returns the first query record in response to the search. For example, the first query record may be selected by the processor, responsive to the search, if the query record is in some way associated with the at least one parameter of the search. For instance, the first query record may include the component "employees" if the structured query received at step 310 includes this term. Thus, if the search includes the parameter of "employees," the first query record may be returned in response to the search (e.g., since the first query record includes the table "employees" as one of the components). In one example, the first query record is returned in response to the search when the first query record is associated with the at least one search parameter and when the first query record satisfies a filter criteria and/or a "sort by" criteria that is included in, or which accompanies the search received at step 340. With respect to the "sort by" criteria, the processor may initially select, for example, a top 10 query records, a top 20 query records, etc. to return at step 350. For instance, if the filter criteria is a particular date, and the "sort by" criteria is "time," a first 20 query records in time order from the specified date may be returned. In one example, the processor may offer to a user to view additional query records after initially presenting the first 20 query records based upon the "sort by" criteria, e.g., a next 20 query records in time order from the specified date, and so forth. Following step 350, the method 300 may proceed to step 395 or to any one of optional steps 360-390.

At optional step 360, the processor may generate at least one recommendation based upon the search. In one example, the at least one recommendation identifies at least one recommended subject. The at least one recommended subject may comprise, for example: a recommended query, a recommended user, a recommended database, a recommended data table, a recommended field, a recommended date range, a recommended time range, or a recommended type of data operation (e.g., a command, operation, or a sequence of commands or operations of a structured query language). In one example, the at least one recommended subject may be selected based upon a rank of the at least one recommended subject with respect to the at least one search parameter.

At optional step 370, the processor may present the at least one recommendation to a user generating the search. For instance, the at least one recommendation may be presented on a user endpoint device via a user interface, such as user interface 200 illustrated in FIG. 2. In one example, the at least one recommendation may be presented by displaying the at least one recommended subject, e.g., without further accompanying information. For instance, the at least one recommendation may be presented within a list of one or more recommended subjects, e.g., in a format such as list 241 in FIG. 2. Alternatively, or in addition, the at least one recommendation may be presented by displaying at least one query record that includes the at least one recommended subject.

At optional step 380, the processor may receive feedback regarding the at least one recommendation from a user generating the search. For example, the user may take various actions with respect to the at least one recommendation, such as submitting additional searches with respect to the at least one recommended subject. For instance, if a recommended user is included in the recommendation presented at optional step 370, the user may then submit an additional search for query records associated with queries submitted by the recommended user. Alternatively, or in addition, the user may contact the recommended user for assistance. In any case, if the user finds the at least one recommendation to be helpful to the user's task, the user may provide positive feedback, e.g., rating the at least one recommendation, the at least recommended subject, and/or a query record presented at optional step 370 more positively on a scale of one to ten, zero to five stars, etc. On the other hand, if the user finds the at least one recommendation to be unhelpful, or not relevant to the user's task, the user may rate the at least one recommendation, the at least recommended subject, and/or a query record presented at optional step 370 more negatively.

At optional step 390, the processor may adjust a rank of the at least one recommended subject based upon the feedback. For instance, in one example, the rating received at optional step 380 and/or the ratings of other users may be used in calculating a rank of the at least one recommended subject with respect to the at least one parameter of the search. In other words, different ranks may be calculated for the at least one recommended subject for different search parameters. In one example, user ratings of different recommended subjects may comprise one of several factors that may be used in calculating the rank. For instance, the number of times in a given time period that a database, data table, or field is accessed may also affect the rank of the database, data table, or field. For example, the more the database, data table, or field is accessed, the higher the rank.

Following step 350 or any one of optional steps 360-390, the method 300 may proceed to step 395 where the method ends. In addition, although not specifically specified, one or more steps, functions or operations of the method 300 may include a storing, displaying and/or outputting step as required for a particular application. In other words, any data, records, fields, and/or intermediate results discussed in the method 300 can be stored, displayed and/or outputted either on the device executing the method 300, or to another device, as required for a particular application.

Furthermore, steps, blocks, functions, or operations in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the examples of the present disclosure.

As such, the present disclosure provides at least one advancement in the technical field of structured query language operations on structured datasets stored in database systems. This advancement is in addition to the traditional methods of managing and manipulating structured datasets via a structured query language. In particular, the present disclosure includes devices, non-transitory computer-readable storage media, and methods that: receive a structured query, parse the structured query into components, store the structured query, the components, and at least one attribute regarding the query in a first query record of a query record storage platform, where the at least one attribute comprises a user identification of a user generating the query, receive a search associated with the query record storage platform, the search including at least one parameter, the at least one parameter specifying at least one of the query, at least one of the components, or at least one of the at least one attribute regarding the query, and return the first query record in response to the search, as well as perform other operations. The present disclosure also provides a transformation of data, e.g., a structured query is parsed into components that are stored in a new query record along with attributes of the query. In addition, parameters of searches that are entered cause the generating of new data, e.g., a recommendation that may include at least one recommended subject. Finally, examples of the present disclosure improve the functioning of a computing device, e.g., a server. Namely, a server for structured query language operations on structured datasets is improved by the use of operations for returning a query record in response to a search associated with a query record storage platform, as described herein.

Figure 4:
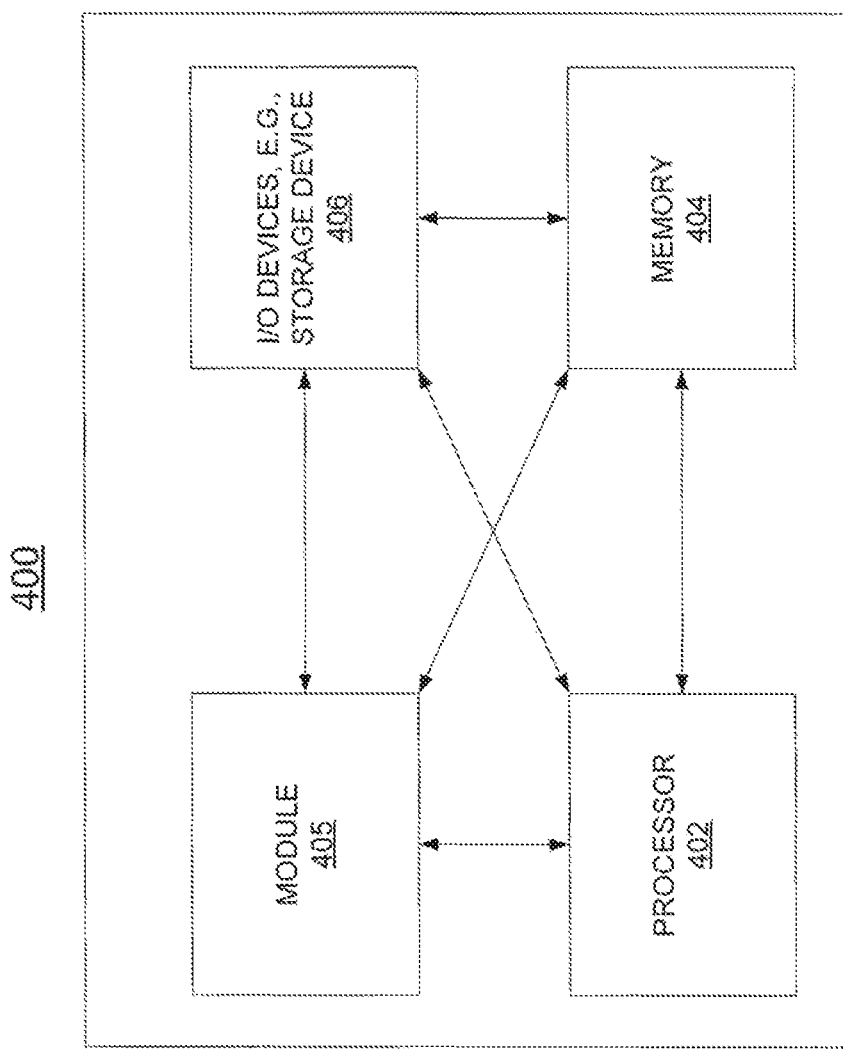
FIG. 4 illustrates a high-level block diagram of a computing device specially programmed for use in performing the functions described herein.

FIG. 4 depicts a high-level block diagram of a computing device specifically programmed to perform the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for returning a query record in response to a search associated with a query record storage platform, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one embodiment, instructions and data for the present module or process 405 for returning a query record in response to a search associated with a query record storage platform (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for returning a query record in response to a search associated with a query record storage platform (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
   a processor; and
   a computer-readable storage medium storing instructions which, when executed by the processor, cause the processor to perform operations, the operations comprising:
      receiving a structured query associated with data in a database system comprising at least one first server, wherein the structured query is received from a first computing device of a first user via at least a first network;
      parsing the structured query into components;
      storing the structured query, the components, and at least one attribute regarding the structured query in a first query record of a query record storage platform, the at least one attribute including a user identification of a user generating the structured query, the query record storage platform comprising at least one second server;
      receiving a search associated with the query record storage platform, the search including at least one parameter, the at least one parameter specifying at least one of: the structured query, at least one of the components, or at least one of the at least one attribute regarding the structured query, wherein the search is received from a second computing device of a second user via at least the first network;
      returning the first query record in response to the search; and
      generating at least one recommendation based upon the search, wherein the at least one recommendation identifies at least one recommended subject, wherein the at least one recommended subject comprises a recommended data table, and wherein the recommended data table is selected for the at least one recommendation based upon a rank of the recommended data table with respect to the at least one parameter of the search, wherein the rank of the recommended data table is based upon at least one of: a volume of queries associated with the recommended data table or a volume of joining of the recommended data table.

2. The device of claim 1, wherein the at least one attribute further comprises at least one of:
   a time of the structured query; or
   a size of a result of the structured query.

3. The device of claim 2, wherein the at least one of the at least one attribute includes:
   the user identification of the user generating the structured query;
   the time of the structured query; or
   the size of the result of the structured query.

4. The device of claim 1, wherein the components include at least one of:
   a database specified in the structured query;
   a data table specified in the structured query;
   a field specified in the structured query;
   a date range specified in the structured query;
   a time range specified in the structured query; or
   a type of data operation specified in the structured query.

5. The device of claim 1, wherein the operations further comprise:
   presenting the at least one recommendation to a user generating the search.

6. The device of claim 5, wherein the presenting the at least one recommendation comprises presenting at least one query record associated with the at least one recommended subject.

7. The device of claim 5, wherein the operations further comprise:
   receiving a feedback regarding the at least one recommendation from the user generating the search; and
   adjusting at least one rank of the at least one recommended subject based upon the feedback.

8. The device of claim 1, wherein the at least one recommended subject further comprises a recommended database, and wherein the recommended database is selected for the at least one recommendation based upon a rank of the recommended database with respect to the at least one parameter of the search.

9. The device of claim 8, wherein the rank of the recommended database is based upon at least one of:
   a volume of queries associated with the recommended database; or
   a volume of joining of data tables of the recommended database.

10. The device of claim 1, wherein the at least one recommended subject further comprises a recommended field, wherein the recommended field is selected for the at least one recommendation based upon a rank of the recommended field with respect to the at least one parameter of the search, wherein the rank of the recommended field is based upon at least one of:
    a volume of queries associated with the recommended field; or
    a volume of joining over the recommended field.

11. A non-transitory computer-readable storage medium storing instructions which, when executed by a processor, cause the processor to perform operations, the operations comprising:
    receiving a structured query associated with data in a database system comprising at least one first server, wherein the structured query is received from a first computing device of a first user via at least a first network;
    parsing the structured query into components;
    storing the structured query, the components, and at least one attribute regarding the structured query in a first query record of a query record storage platform, the at least one attribute including a user identification of a user generating the structured query, the query record storage platform comprising at least one second server;
    receiving a search associated with the query record storage platform, the search including at least one parameter, the at least one parameter specifying at least one of: the structured query, at least one of the components, or at least one of the at least one attribute regarding the structured query, wherein the search is received from a second computing device of a second user via at least the first network;
    returning the first query record in response to the search; and
    generating at least one recommendation based upon the search, wherein the at least one recommendation identifies at least one recommended subject, wherein the at least one recommended subject comprises a recommended data table, and wherein the recommended data table is selected for the at least one recommendation based upon a rank of the recommended data table with respect to the at least one parameter of the search, wherein the rank of the recommended data table is based upon at least one of: a volume of queries associated with the recommended data table or a volume of joining of the recommended data table.

12. The non-transitory computer-readable storage medium of claim 11, wherein the components include at least one of:
   a database specified in the structured query;
   a data table specified in the structured query;
   a field specified in the structured query;
   a date range specified in the structured query;
   a time range specified in the structured query; or
   a type of data operation specified in the structured query.

13. The non-transitory computer-readable storage medium of claim 11, wherein the operations further comprise:
   presenting the at least one recommendation to a user generating the search.

14. The non-transitory computer-readable storage medium of claim 13, wherein the presenting the at least one recommendation comprises presenting at least one query record associated with the at least one recommended subject.

15. A method, comprising:
   receiving, by a processor, a structured query associated with data in a database system comprising at least one first server, wherein the structured query is received from a first computing device of a first user via at least a first network;
   parsing, by the processor, the structured query into components;
   storing, by the processor, the structured query, the components, and at least one attribute regarding the structured query in a first query record of a query record storage platform, the at least one attribute comprising a user identification of a user generating the structured query, the query record storage platform comprising at least one second server;
   receiving, by the processor, a search associated with the query record storage platform, the search including at least one parameter, the at least one parameter specifying at least one of: the structured query, at least one of the components, or at least one of the at least one attribute regarding the structured query, wherein the search is received from a second computing device of a second user via at least the first network;
   returning, by the processor, the first query record in response to the search; and
   generating, by the processor, at least one recommendation based upon the search, wherein the at least one recommendation identifies at least one recommended subject, wherein the at least one recommended subject comprises a recommended data table, and wherein the recommended data table is selected for the at least one recommendation based upon a rank of the recommended data table with respect to the at least one parameter of the search, wherein the rank of the recommended data table is based upon at least one of: a volume of queries associated with the recommended data table or a volume of joining of the recommended data table.

16. The method of claim 15, wherein the at least one attribute further comprises at least one of:
   a time of the structured query; or
   a size of a result of the structured query.

17. The method of claim 16, wherein the at least one of the at least one attribute includes:
   the user identification of the user generating the structured query;
   the time of the structured query; or
   the size of the result of the structured query.

18. The method of claim 15, wherein the components include at least one of:
   a database specified in the structured query;
   a data table specified in the structured query;
   a field specified in the structured query;
   a date range specified in the structured query;
   a time range specified in the structured query; or
   a type of data operation specified in the structured query.

19. The method of claim 15, further comprising:
   presenting the at least one recommendation to a user generating the search.

20. The method of claim 19, wherein the presenting the at least one recommendation comprises presenting at least one query record associated with the at least one recommended subject.

* * * * *